(12) United States Patent
McDowall

(10) Patent No.: US 9,596,141 B2
(45) Date of Patent: Mar. 14, 2017

(54) REPRESENTING SOFTWARE DEFINED NETWORKS USING A PROGRAMMABLE GRAPH MODEL

(71) Applicant: CISCO TECHNOLOGY, INC., San Jose, CA (US)

(72) Inventor: John E. McDowall, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 651 days.

(21) Appl. No.: 13/844,021

(22) Filed: Mar. 15, 2013

(65) Prior Publication Data

US 2014/0280900 A1 Sep. 18, 2014

(51) Int. Cl.
| | |
|---|---|
| *G06F 15/173* | (2006.01) |
| *H04L 12/24* | (2006.01) |
| *H04L 12/751* | (2013.01) |
| *H04L 12/26* | (2006.01) |
| *H04W 40/24* | (2009.01) |

(52) U.S. Cl.
CPC .......... *H04L 41/12* (2013.01); *H04L 12/2416* (2013.01); *H04L 43/045* (2013.01); *H04L 45/02* (2013.01); *H04W 40/24* (2013.01)

(58) Field of Classification Search
CPC ....... H04L 41/12; H04L 43/045; H04L 45/02; H04L 12/2416; H04W 40/24
See application file for complete search history.

(56) References Cited

U.S. PATENT DOCUMENTS

| | | | | |
|---|---|---|---|---|
| 6,477,572 | B1 * | 11/2002 | Elderton | ................ H04L 41/12 709/224 |
| 2002/0184361 | A1 * | 12/2002 | Eden | ............................ 709/224 |
| 2014/0280864 | A1 * | 9/2014 | Yin et al. | ...................... 709/224 |

* cited by examiner

*Primary Examiner* — Nam Tran
(74) *Attorney, Agent, or Firm* — Patterson + Sheridan LLP

(57) ABSTRACT

System, method, and computer program product to represent a network using a programmable graph model, by generating a directed graph to represent a topology of the network, wherein each of a plurality of network elements in the network are represented, in the directed graph, by one of the plurality of nodes, identifying, through the directed graph, a subset of network elements, of the plurality of network elements, upon which to apply a requested operation, and applying the requested operation to the subset of network elements in a distributed manner through the directed graph.

30 Claims, 8 Drawing Sheets

| Node | Metadata | Interfaces |
|---|---|---|
| N1 | Firewall, QoS, L3 Routing | E1:N2 |
| N2 | L3 Routing, QoS | E1:N1; E4:N3; E3:N9 |
| N3 | VOIP | E3:N2 |
| N4 | L3 Routing, QoS | E5:N2; E6:N9 |
| N5 | VOIP | E9:N6 |
| N6 | L2 Switch | E9:N5; E8:N7; E7:N9 |
| N7 | Workstation | E8:N6 |
| N8 | Server | E2:N9 |
| N9 | L2 Switch, QoS | E2:N8; E3:N2; E6:N4; E7:N6 |

701

REPRESENTING SOFTWARE DEFINED NETWORKS USING A PROGRAMMABLE GRAPH MODEL

TECHNICAL FIELD

Embodiments presented in this disclosure generally relate to computer software. More specifically, embodiments disclosed herein relate to representing software defined networks using a programmable graph model.

BACKGROUND

Networks have not traditionally been programmable entities. Although some programming frameworks may be used to configure networks, the intelligence has always been external to the network, and not an intrinsic part of the network itself. It would be useful to put more programmability in each switch and router rather than in the framework, where network operations may be implemented as a series of operations that are reflected into the network hardware. As networks become more complex and the need for them to respond to external changes in near real-time, the current approach of configuring networks at individual devices becomes impractical.

Network hardware has also suffered from a lack of introspection and reflection. Introspection is the ability of a program to examine the type or properties of a network element at runtime. Reflection allows programs the ability to manipulate the values, metadata, properties, and functions of the network element.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
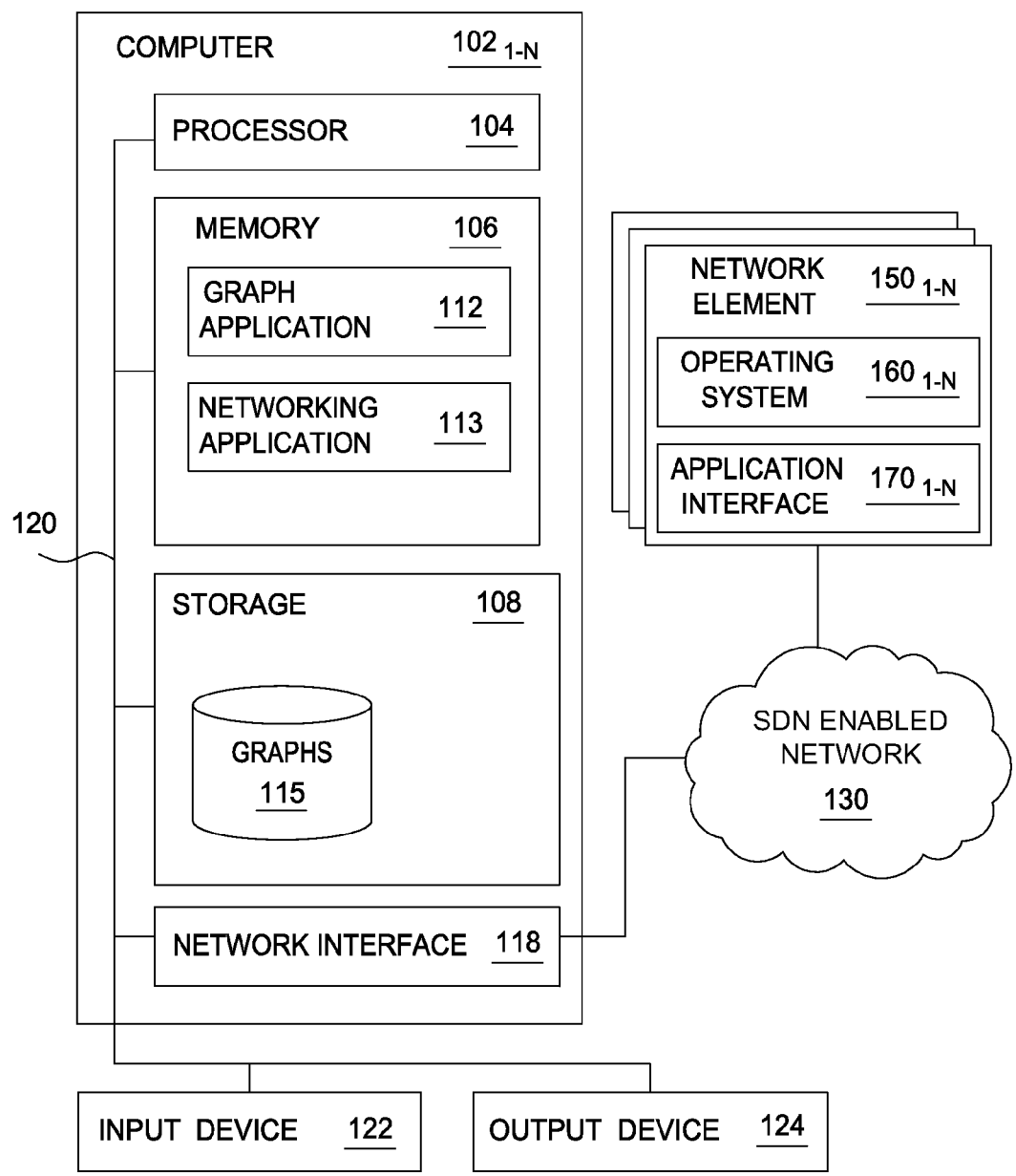
FIG. 1 illustrates a system for representing software defined networks using a programmable graph model, according to one embodiment disclosed herein.

Embodiments disclosed herein provide a system, method, and computer program product to represent a network using a programmable graph model, by generating a directed graph to represent a topology of the network, wherein each of a plurality of network elements in the network are represented, in the directed graph, by one of the plurality of nodes, identifying, through the directed graph, a subset of network elements, of the plurality of network elements, upon which to apply a requested operation, and applying the requested operation to the subset of network elements in a distributed manner through the directed graph.

DESCRIPTION OF EXAMPLE EMBODIMENTS

Embodiments disclosed herein provide a high-level dynamic programming model to program SDN enabled networks by abstracting many low level details about individual network elements. The high level programming model combines a consistent device programming model used across all network elements, a graph used to represent network elements as nodes in the graph, and then uses the graph to apply functions in a distributed fashion to the appropriate network elements locally or remotely from a central server. Embodiments disclosed herein work equally well in physical and virtual SDN enabled networks.

In addition, embodiments disclosed herein provide introspection and reflection across a range of network element hardware platforms to identify capabilities of the network elements and to modify or extend these capabilities through software programs that execute external to, or within the network elements directly. In order to provide hardware introspection and reflection, embodiments disclosed herein define a set of abstractions that allow programmable read/write/change access to the network hardware. By using a plurality of base service sets, application developers may execute existing applications within a container and discover other services and network resources.

Software defined networking (SDN) techniques disclosed herein allow a network, traditionally a static entity, to become more dynamic in nature. SDN opens networks to application developers, who may write applications to manage network elements and data flows passing through a network element, without requiring physical access to the network elements themselves. Thus, rather than a network element being a fixed-function "appliance," SDN considers network hardware to be part of a distributed computational system that can be manipulated by software. An application developer writing applications for an SDN may execute the application "in the network," which may include any device which processes data flows between computing systems, e.g., a switching or routing element connecting host systems to a network (and devices connecting one computing network to another), as well as other computing devices able to execute the application while connected to the network. The application may execute commands and apply functions to the network devices (and the data flows) remotely, or locally on the network element itself. Using applications in an SDN, developers may manage networking functions of a network element, such as routing, quality of service (QoS), and bandwidth allocation, as well as manage performance and/or properties the network elements themselves. Additionally, different programming logic may be applied to different flows or packets in the same network topology, such that each network graph need not have its own instance of the SDN application.

In order to manage network elements and their attributes and functions, embodiments disclosed herein provide network elements capable of hardware introspection and reflection. In addition, to apply functions across a group of such network devices (e.g., a group of routing and switching elements within a data center), many of which operate using different operating systems and programming models, a common programming model is used. Embodiments disclosed herein provide a common programming model such that network elements may be accessed and modified using the same SDN applications through the use of a plurality of application program interfaces (APIs) which abstract system and network services common to all network elements.

Software-defined networking (SDN), in general, provides additional flexibility and solidarity relative to conventional networks. Using an SDN controller, which may be either centrally located or located on the respective network devices, a network administrator can configure the control plane and dictate how the network devices route data. For example, the network administrator may assign criteria or SDN rules that, when satisfied, instruct the network device to perform a specific action on the received packet—e.g., drop the packet, forward the packet to a particular network device, evaluate the packet using an application on the network device, and the like. In one embodiment, the SDN controller configures the routing table or forwarding table (i.e., forwarding information base) in a network device based on the criteria or SDN rules.

After receiving a packet on an ingress port, a network device in the SDN enabled network may evaluate the packet to determine what action to take. The network devices may rely on the different headers of the packet—e.g., source and destination addresses, security group tag, MAC-layer priority value, VLAN ID, etc.—to determine the action. Alternatively or additionally, the network device may perform a deep packet inspection to determine what action is appropriate. By matching the packets to a packet field in a SDN rule, the network device is able to identify an action to take regarding the packet.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a graph generator or related data available in the cloud. For example, the graph generator could execute on a computing system in the cloud and generate a graph to represent the network elements in a network. In such a case, the graph generator could store the graphs at a storage location in the cloud. Doing so allows a user to access this information from any computing system attached to a network connected to the cloud (e.g., the Internet).

While embodiments are described herein using a switch or router as a reference example of a network element configured with reflection and introspection services, any reference to such a switch or router is a reference example used to illustrate broader concepts of the disclosure. Additionally, the term "packet" is used broadly and includes frames, or any other packaging of data sent between host systems, and any use of the term packet should not be considered limiting of the disclosure.

FIG. 1 illustrates a system 100 for representing software defined networks using a programmable graph model, according to one embodiment disclosed herein. A plurality of computers $102_{1-N}$ may be connected to other computers $102_{1-N}$ and network elements $150_{1-N}$ via an SDN enabled network 130. In general, the SDN enabled network 130 may be any computing network (or network of networks).

The computers $102_{1-N}$ generally include a processor 104 connected via a bus 120 to a memory 106, a network interface device 118, a storage 108, an input device 122, and an output device 124. The computers $102_{1-N}$ are generally under the control of an operating system. Examples of operating systems include the UNIX® operating system, distributions of the Linux® operating system, and the IOS operating system by Cisco Systems®. The processor 104 is included to be representative of a single CPU, multiple CPUs, a single CPU having multiple processing cores, and the like. The processor 104 may execute software developed for the purposes of embodiments disclosed herein. Similarly, the memory 106 may be a random access memory, such as a set of DRAM memory blocks. The network interface device 118 may be any type of network communications device allowing the computers $102_{1-N}$ to communicate with other computers via the SDN enabled network 130.

The storage 108 may be a disk drive storage device. Although shown as a single unit, the storage 108 may be a combination of fixed and/or removable storage devices, such as fixed disc drives, solid state drives, optical storage, flash memory devices, network attached storage (NAS), or a connection to a storage area-network (SAN).

The input device 122 may be used to provide input to the computer $102_{1-N}$. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 contains a graph application 112, which provides software generally configured to generate a directed graph reflecting the topology of the computers $102_{1-N}$ and network elements $150_{1-N}$ in the SDN enabled network 130. The directed graph generated by the graph application 112 may reflect a network topology based on different networking layers, such as layer 2, layer 3, and so on. The memory 106 also contains a networking application 113, which may be any application intended to inspect and modify the networking capabilities, attributes, and functionalities of the network elements 150, as well as the data flows passing through them. For example, the networking application 113 may request attributes and capabilities from a network element $150_{1-N}$ as well as invoke commands changing the configuration of the network element $150_{1-N}$. Additionally, the networking application 113 may modify the core functionality of the network element $150_{1-N}$ in order to manipulate the forwarding and processing of data flows in the network element $150_{1-N}$. In one embodiment, the networking application 113 uses the graphs 115 to determine the network elements $150_{1-N}$ to which the functions should be applied, and apply the functions to them. As shown, storage 108 contains the graphs 115. Although depicted as a database, the graphs 115 may use other forms of data storage or representation, e.g., xml data files, and the like. Further, while depicted as being separate applications, in one embodiment, the graph application 112 may be an integrated component of the networking application 113.

The network elements $150_{1-N}$ in the SDN enabled network 130 may be any networking device, including, e.g., a router, switch, bridge, hub, or a computer including a network interface. As previously indicated, the use of a particular network element herein is for illustrative purposes, and should not be considered limiting of the disclosure. The network elements $150_{1-N}$ may each operate a respective one of a plurality of operating systems $160_{1-N}$. The network elements $150_{1-N}$ each operate under a common programming model implemented to allow different types of functions to be applied in a consistent manner, by the networking application 113. As shown, the network elements $150_{1-N}$ also include a plurality of application interfaces $170_{1-N}$, which abstract the underlying representations of the network element $150_{1-N}$ such that the networking application 113 may apply its functions to each network element $150_{1-N}$ in a distributed manner. The application interfaces $170_{1-N}$ also allow for introspection and reflection into the network elements $150_{1-N}$.

Note, however, that the system 100 depicts one arrangement implementing the software defined networking techniques disclosed herein. In another embodiment, the computers $102_{1-N}$ are network elements $150_{1-N}$ capable of executing containerized applications such as the graph application 112 and the networking application 113 on their own processors, which may be developed for the purposes of embodiments disclosed herein. In still another embodiment, the computers $102_{1-N}$ may be blade servers which execute the graph application 112 and networking application 113.

Figure 2:
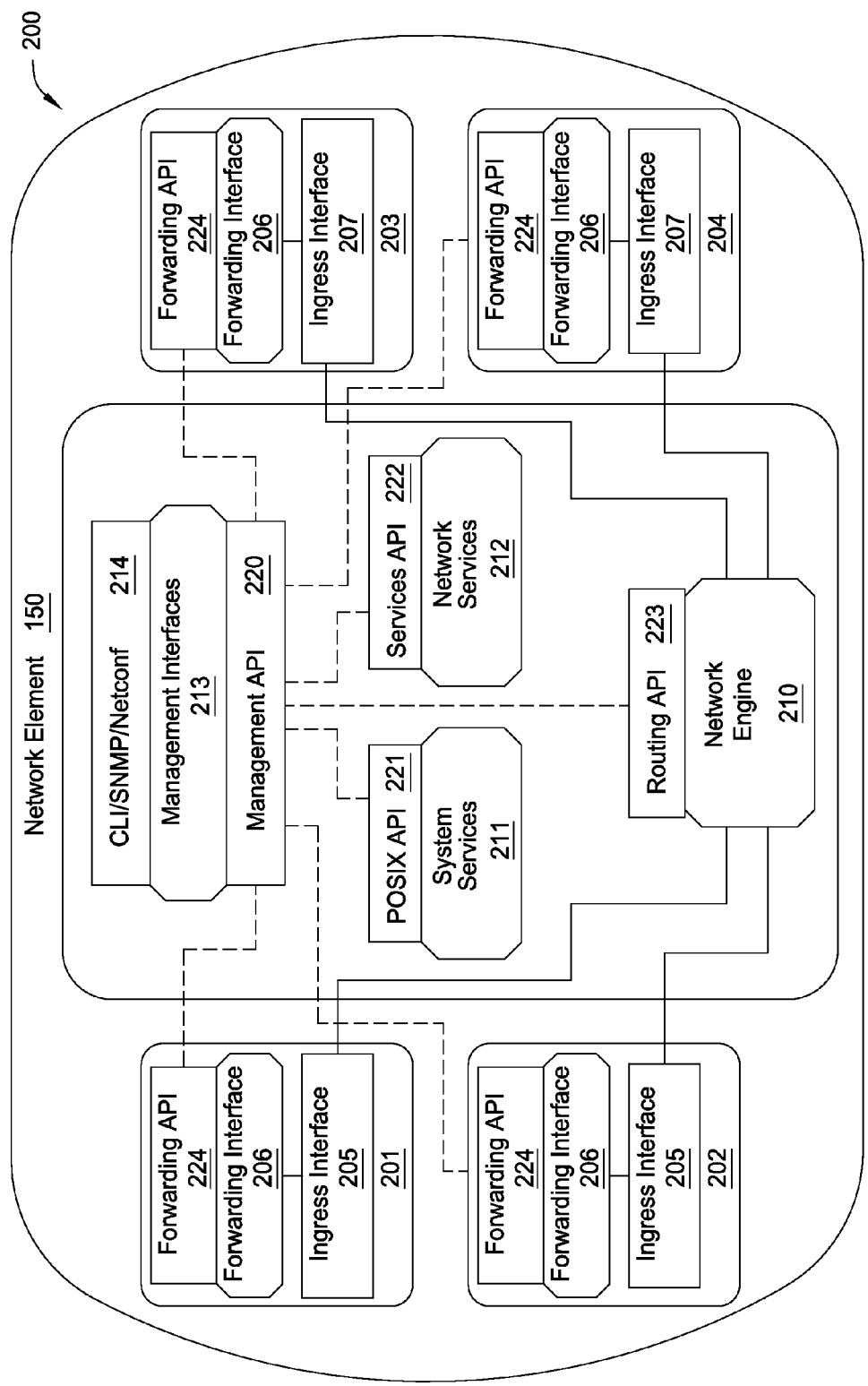
FIG. 2 illustrates a detailed view of a network element in a software defined network, according to one embodiment disclosed herein.

FIG. 2 illustrates a detailed view 200 of a network element 150 in a software defined network, according to one embodiment disclosed herein. For the sake of clarity, data flow is represented by solid lines, while control flow is represented by dotted lines in FIG. 2. As shown, the network element 150 includes a plurality of network interfaces 201-204. Network interfaces 201 and 202 have ingress interfaces 205, indicating that these ports receive data from other network elements $150_{1-N}$ in the SDN enabled network 130. Network interfaces 203 and 204 have egress interfaces 207, indicating that these ports transmit data to other network elements $150_{1-N}$ in the SDN enabled network 130. A forwarding interface 206 in each network interface 201-204 is used to forward network packets to the appropriate destination. In a graph generated by the graph application 112, each network element 150 may be represented by a graph node, while the network interfaces 201-204 may be represented by a graph edge.

As shown, the network element 150 includes a network engine 210, which is generally configured to control the functionality of the network element 150. For example, in embodiments where the network element 150 is a router or switch, the network engine 210 provides routing and switching functions. The network element 150 also includes system services 211, network services 212, and a management interface 213. Collectively, the system services 211, network services 212 and management interfaces 213 provide for hardware introspection and reflection of the network element 150, described in greater detail below. Collectively, these services provide the following services sets, shown in Table I:

TABLE I

| Service Set | Description |
| --- | --- |
| Data Path | Provides packet delivery service to application (copy, punt inject) |
| Policy | Provides filtering (NBAR, ACL), classification (class-maps, policy-maps), actions (marking, policing, queuing, copy, punt), and applies policies to interfaces on network elements |
| Routing | Read routing information base (RIB) routes, add/remove routes, receive RIB notifications |

TABLE I-continued

| Service Set | Description |
| --- | --- |
| Element | Provide element properties, CPU/memory statistics, network interfaces, element and interface events |
| Discovery | Provides L3 topology and local service discovery |
| Utility | Provide syslog events notification, path tracing capabilities (ingress/egress and interface stats, next-hop info, etc) |
| Developer | Debug capability, command line interface (CLI) extension allowing applications to extend/integrate application's CLIs with network element |

Figure 4:
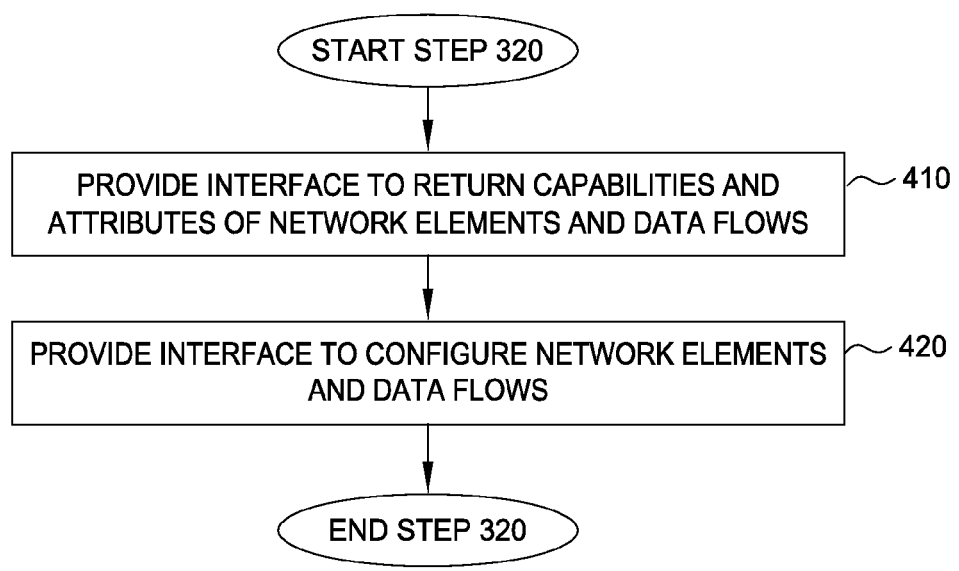
FIG. 4 illustrates a method to provide introspection and reflection in network elements in a software defined network, according to one embodiment disclosed herein.
Figure 5:
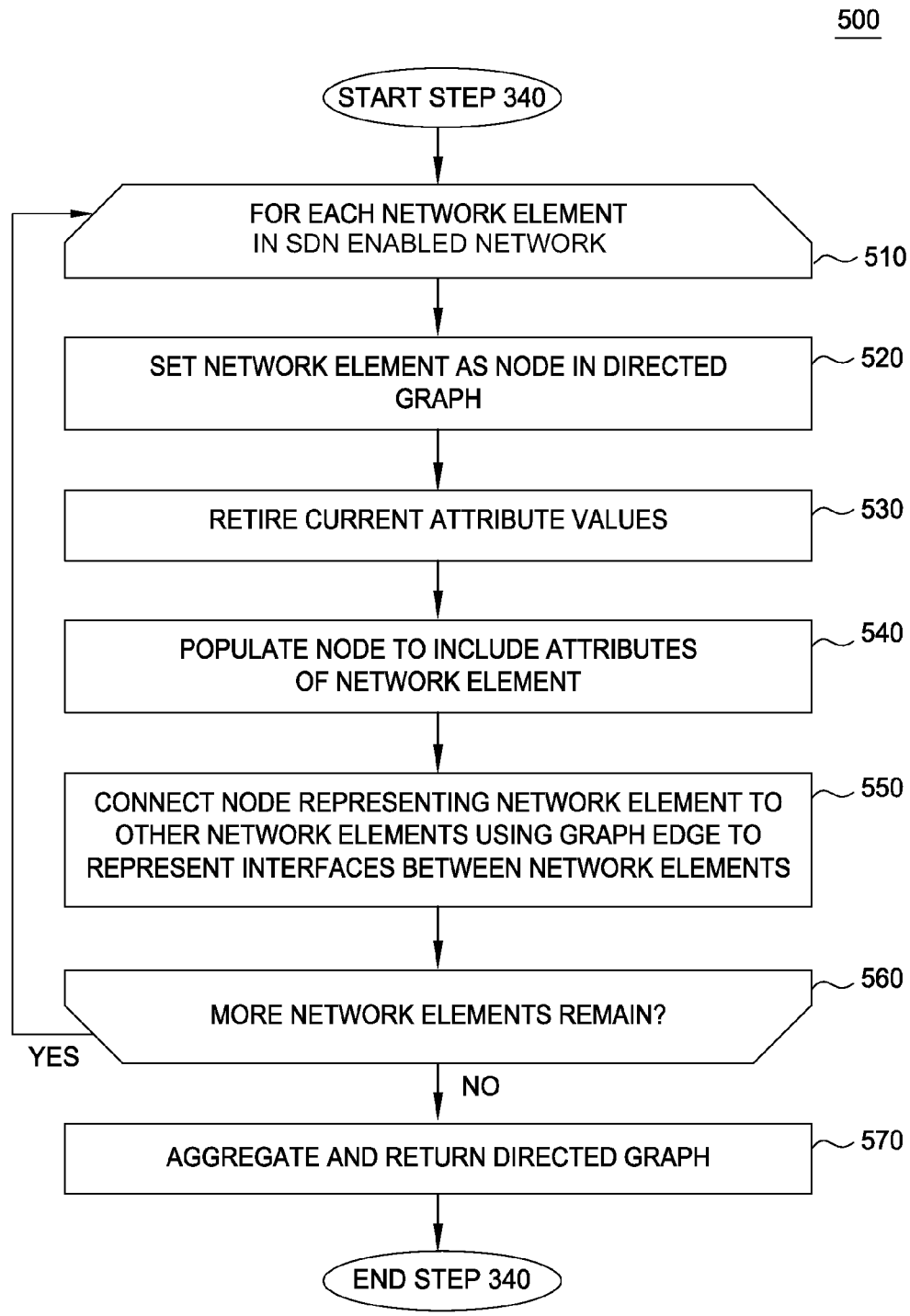
FIG. 5 illustrates a method to generate a graph representing a software defined network, according to one embodiment disclosed herein.

The individual service sets which provide hardware introspection and reflection are discussed in conjunction with FIG. 4. As shown, application programming interfaces (APIs) abstract the underlying services and interfaces of the network element 150. For example, the forwarding API abstracts the forwarding interface 206. A portable operating system interface (POSIX) API 221 abstracts the system services 211. A services API 222 abstracts the network services, while a management API abstracts the management interfaces 213. The management interfaces 213 may be accessed by an application developer using a CU, the simple network management protocol (SNMP), or Netconf (network configuration protocol) 214. As shown, the management interfaces 213, through the management API 220, orchestrates access to all other services and APIs in the network element 150.

Figure 3:
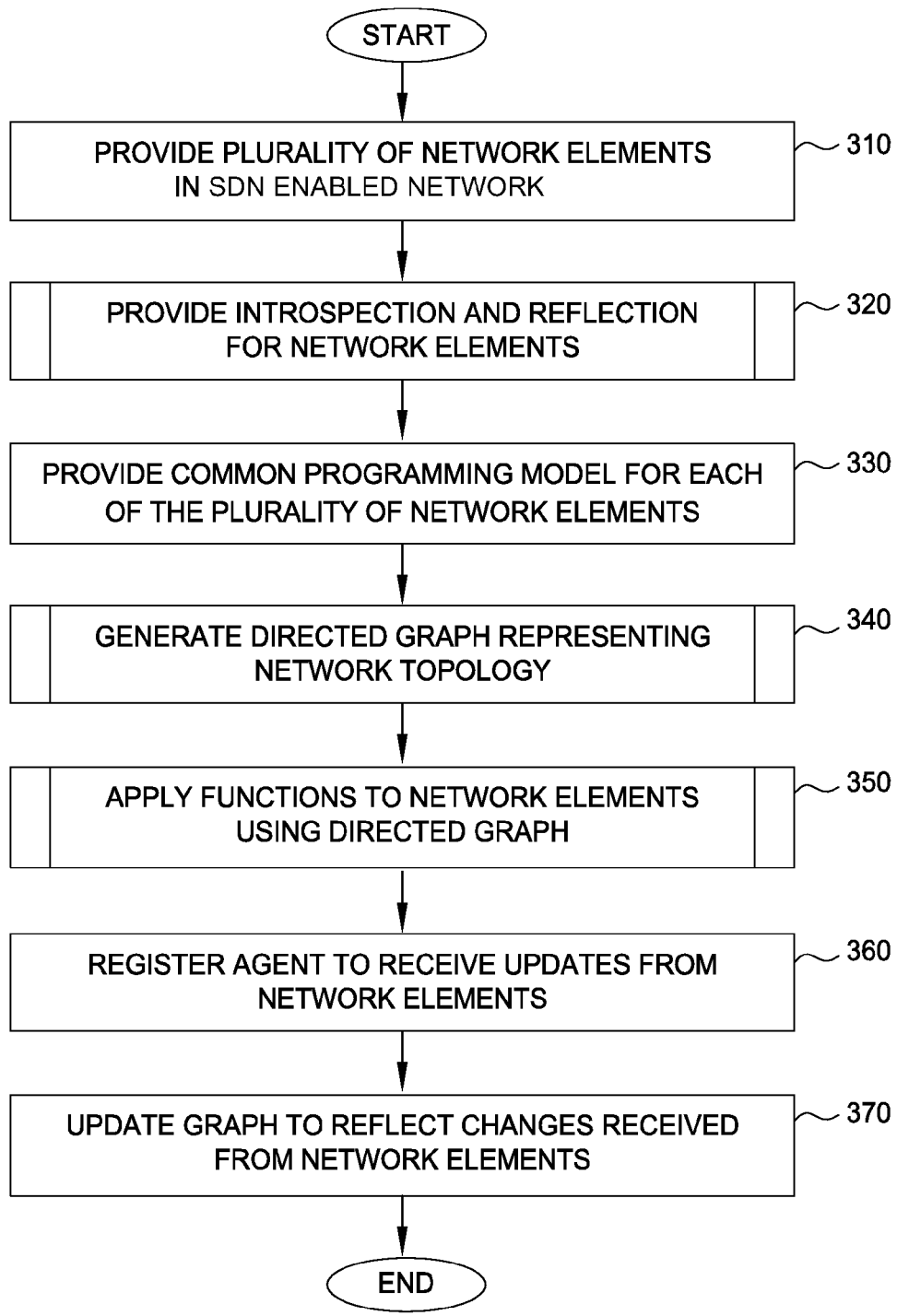
FIG. 3 illustrates a method to represent software defined networks using a programmable graph model, according to one embodiment disclosed herein.

FIG. 3 illustrates a method 300 to represent SDN enabled networks using a programmable graph model, according to one embodiment disclosed herein. At step 310, a plurality of network elements are provided in a SDN enabled network. The network elements may be any network element, including but not limited to a router, switch, gateway, internet telephone, mobile device, computer, server, and the like. The plurality of network elements may be connected via wired and wireless communications channels to form a network. The network elements may be physical as well as virtual network elements. At step 320, introspection and reflection are provided for each of the plurality of network elements. Introspection refers to the ability of software to examine the type or properties of a network element at runtime. Reflection refers to the ability for software to manipulate values, metadata, properties, and functions of a network element at runtime. At step 330, a common programming model for each of the plurality of network elements, both physical and virtual, is provided. A functional programming language exposes a common programming model, with the attributes of the network elements and manipulation functions (i.e., the introspection and reflection capabilities), which allows developers to create SDN applications that operate the abstractions provided by the common programming model. Thus, the common programming model defines a set of components that are connected through the programming model. The device model can then be broken down into further programming nodes.

At step 340, a directed graph representing the network topology is generated. Generally, the nodes of the directed graph represent the network elements in the network, and edges of the directed graph represent interfaces between the network elements. Additionally, the graph may include metadata related to each network element, such as a type of network element, capabilities, interfaces, routing tables, switching tables, and other logic. The graph may be used to portray different views of the network topology, such as L2, L3, and L7 views, as well as different tunneling protocols such as MPLS. Advantageously, the graph may be updated in real time to reflect changes to the SDN enabled network, resulting in a real time view of the network topology.

At step 350, functions are applied to the network elements identified in the directed graph generated at step 340. The functions may specify to modify or return a particular attribute of the network element, or apply (or modify) a specific action or filter that can be applied to packets and flows at the ingress and egress interfaces of the network element. For example, hardware capabilities such as the ability to perform deep packet inspection or cryptography may be enabled or disabled (in hardware or software). Having a consistent programming model exposed through a directed graph structure enables the ability to apply functions to the graph using functional programming techniques. The system architecture allows the functions to be applied in a distributed fashion to each device or remotely from a central server. In one embodiment, the functions are lambda functions. At step 360, an agent is registered to receive updates from the network elements, such that state changes in the SDN enabled network are reflected in the graph. State changes in the underlying SDN enabled network may be reflected as events that may be subscribed to by the agent. The subscriptions may specify parameters to filter the events, such that only relevant events are received at the graph model. The events may annotate the graph model with additional metadata to reflect changes. At step 370, the graph is updated to reflect changes received from the network elements, thereby providing a real time view of the SDN enabled network.

FIG. 4 illustrates a method 400 to provide introspection and reflection in network elements in a SDN enabled network, according to one embodiment disclosed herein. The method 400 corresponds to step 320 of the method 300. Generally, the steps of the method 400 are performed to define a set of abstractions to allow programmable read/write/modify access to network element hardware. The interfaces provided are consistent across supported platforms and standardize identification and modification capabilities across different types of network elements.

Embodiments disclosed herein provide service sets which provide a set of base network services that allow application developers to run existing applications that run on any platform within a container and discover other services and network resources. Such network services implement the common APIs invoked by application 113. The network service may be made available to the developer's application in the language and programming of model of choice by the service presentation function in an application presentation library. The layer below the application presentation library may be an application communication library, which may act as the client for transporting network services from the network element. A service set may be derived from one or more network element features, and may require one or more feature APIs. The implementation of a network service from these feature APIs occurs within a network element abstraction library. The layer below the abstraction library is the network element communication library, which may act as the server for transporting the network service to one or more applications requiring the service.

At step 410, interfaces to return capabilities are provided, and values of attributes of network elements and data flows within the network elements are provided. The capabilities of network elements may be specific network functions which may be performed by each respective network element, including, but not limited to, routing, firewall, Quality of Service (QoS), deep packet inspection, encryption, and compression. The attributes of a network element may include, but are not limited to, hardware components, operating systems, physical location, states, interfaces, interface attributes, element and interface events, and the like. In one embodiment, an element service set may be provided, which returns the network element properties and attributes. The properties and attributes may be any capability or statistic related to the network element and its hardware, such as CPU/memory usage, an operating system, interface statistics and properties, and the like. An application requesting information, such as the networking application 113, connects to a network element and a resulting session is managed by the element service set. Once the networking application 113 is authenticated and authorized, it may access the network element information and other provided service sets.

Example services provided by the element service set include the ability to provide information representing the hardware that hosts the network element's operating system and providing services to requesting applications. The element service set may also provide static attributes of the network element, which may be cached, and dynamic attributes of the network elements that may be retrieved on demand to reflect the latest network element status. Example attributes include a textual description of the network element, which indicates the full name and version identification of the network element's hardware type, software operating system, and networking software. Additionally, the description may include an assigned name for the network element and a time since the network element was last restarted. Process information about the network element may also be returned, such as CPU and memory status, which indicate the processes running on the network elements.

The element service set may also provide introspection into network element interfaces and ports, by providing an abstraction for virtual and/or physical interfaces on a network element. The element service set may provide information related to interface attributes, including, but not limited to, a static property, configuration, dynamic status, and packet statistics of the network interface. Additionally, an application using the element service set may register for network interface events, such as CDP (Cisco Discovery Protocol) events, filtering criteria, and state events. By providing these base services and information, embodiments disclosed herein provide introspectable hardware across all types of hardware. An application, such as the networking application 113, may connect to each network element in a network path, identify what type of element it is, how it is performing, and what capabilities it has.

At step 420, an interface to configure network elements and data flows is provided. In one embodiment, a plurality of service sets, which sit on top of the network element service set, are provided to return information and allow real-time configuration of the hardware and flows passing through the network elements. A discovery service set may provide a mechanism for an application, such as the networking application 113, to discover remote or local network elements, a network topology, and network elements providing common services. The discovery mechanism may be dynamic or static. The discovery interface may use a discovery protocol, such as CDP, on the network element or from the requesting application itself. In either case, information returned to the application will be the same, with the source of the information being the only difference. In the case of a remote discovery, the event source may be the name of the network element, and in the case of application discovery, the event source may be the application name.

A utility service set may provide an interface to perform authentication, authorization, and accounting (AAA) for users using standard RADIUS/TACACS+ protocols without requiring an AAA client that understands these protocols. The utility service set may also allow applications to register for notifications of events. A developer service set may provide interfaces to set, unset, and query a logging level, audit trails, a tracing interface, and a management interface. The developer service set may also enable, disable, or modify debugging in the network elements.

A datapath service set may allow an application developer to hook into the packet flow of a network element, such as a switch or a router, and extract packets from that flow of packets. These packets may either be copied from the data path to an application, such as the networking application 113, or they may be punted or diverted to the networking application 113. When a packet is punted, it does not continue to its destination until the application returns it to the data path, possible modified. When copied, a copy of the packet continues to its destination, while the other is sent to the application.

A policy service set allows requesting applications to apply a QoS policy to a network element. Introspection of the policy capabilities provides hardware capabilities to filter flows (based on source address, destination address, port number, or even deep packet inspection), and which actions can be applied to the flows discovered (such as QoS, drop, policy modify, etc.). A routing service set provides route up/down support, and access to the application route table.

Using the combination of introspective services and reflective services, connected applications may modify, configure, and monitor network elements and the data flows within the network elements. The introspective services identify a network element and its attributes by answering what it is, what it can do, and what other network elements it is connected to. The reflective services indicate what the network element is doing, how its operation can be changed in real time. Embodiments disclosed herein not only provide introspective and reflective services, but also allow for outside control and extension of these services by applications such as the networking application 113.

The method 500 corresponds to step 420 of the method 300. Generally, the steps of the method 500 produce a directed graph where the graph nodes represent network elements and the graph edges represent interfaces between the network elements in the SDN enabled network. At step 510, the graph application 112 executes a loop including steps 520-560 for each network element in the SDN enabled network. At step 520, the graph application 112 sets the current network element as a node in the directed graph. At step 530, the graph application 112 retrieves current attribute values of the network element. The attributes may include, but are not limited to, hardware components, routing tables, switching tables, functionalities, interfaces, links, statuses, and capabilities. The attributes may also include link state information of the respective network element, routing information of the respective network element, and source and destination information of application data flowing through the respective network element.

At step 540, the graph application 112 populates the node to include attributes of the network element retrieved at step 530. At step 550, the graph application 112 connects the node representing the current network element to other network elements using a graph edge to represent interfaces between the network elements. In one embodiment, the graph is generated by connecting a node representing the current network element only to nodes representing network elements to which the current network element is directly connected. Stated differently, level 2 reachability information for only a single hop is considered in generating edges to connect nodes in the directed graph. By querying network elements to return only the network elements to which they are directly connected, the complete graph may be pieced together, and generated more efficiently. At step 560, the graph application 112 determines whether more network elements remain to be included in the graph. If more network elements remain, the graph application 112 returns to step 510. If no more network elements remain, the graph application aggregates and returns the directed graph at step 570. The directed graph is aggregated to mesh each node together in view of the one hop connection information returned for each node. The directed graph may be stored in memory for short term use, or stored in a more permanent location, such as the graphs 115, for later use.

Figure 6:
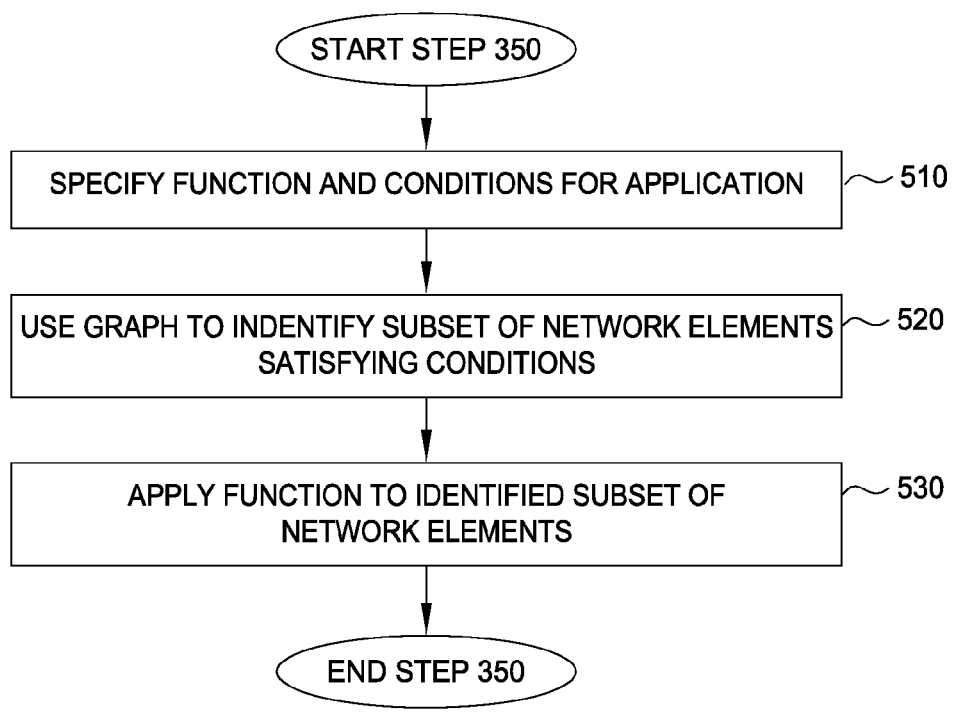
FIG. 6 illustrates a method to apply functions to network elements in a software defined network using a graph, according to one embodiment disclosed herein.

FIG. 6 illustrates a method 600 to apply functions to network elements in a SDN enabled network using a directed graph, according to one embodiment disclosed herein. The method 600 corresponds to step 350 of the method 300. Generally, the steps of the method 600 allow functions to be applied in a distributed fashion to each network element locally or remotely from a central server. At step 610, the networking application 113 specifies a function to invoke, along with conditions for application of the function. For example, the function may specify to apply a firewall rule that allows all traffic from 12:00 AM to 12:01 AM. At step 620, the networking application 113 uses the directed graph representing the SDN enabled network to identify a subset of network elements satisfying the condition. For example, the networking application 113 may identify the network elements in the graph with attributes specifying that the network element includes firewall capabilities. At step 630, the networking application 113 applies the function to the identified subset of network elements. Continuing with the firewall example, a command may be issued to each firewall identified at step 620 such that the rules of each firewall are updated to allow all traffic from 12:00 AM to 12:01 AM. By implementing the steps of the method 600, the programming of SDN enabled networks is reduced to a set of operations on graphs which provide views into the SDN enabled network. This may greatly simplify all parts of network operation functions, and make the process more dynamic, as it removes the need for operating on individual devices.

Figures 7A, 7B:
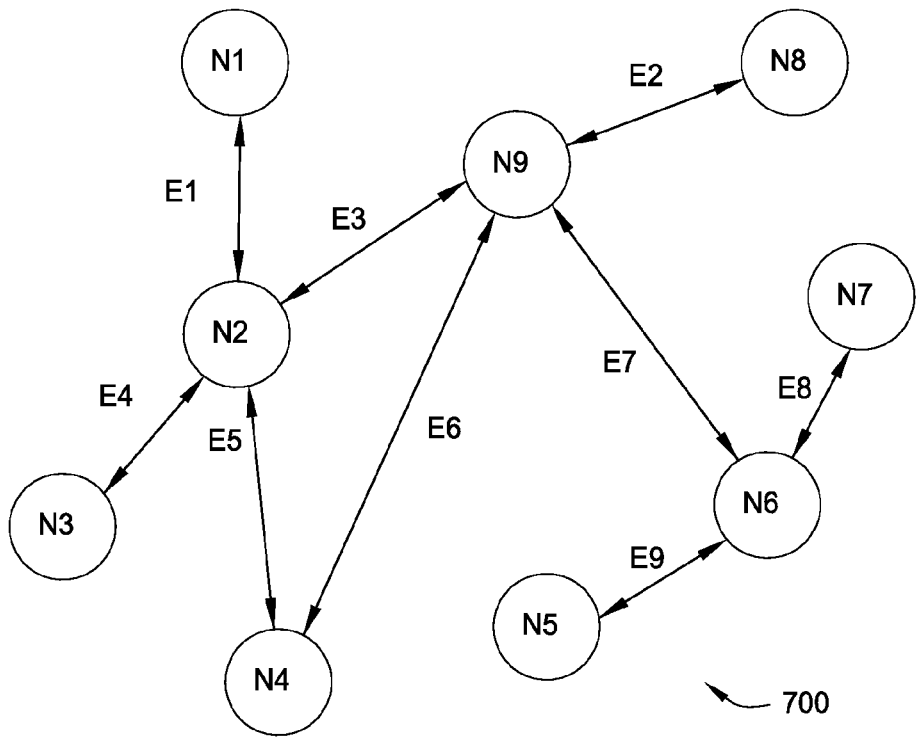
FIG. 7A illustrates a graph representing a software defined network, according to one embodiment disclosed herein.
FIG. 7B illustrates a table representing nodal attributes included in a graph used to represent a software defined network, according to one embodiment disclosed herein.

FIG. 7A illustrates a graph 700 representing a SDN enabled network, according to one embodiment disclosed herein. As shown, nodes N1-N9, each representing a respective network element, are connected in the directed graph by a plurality of edges E1-E8. The nodes N1-N9 may represent any type of networking element, physical or virtual, including, but not limited to a router, switch, network interface card, computer, mobile device, internet phone, teleconferencing and video conferencing equipment, server, gateway, and the like. Each node N1-N9 may include information pertaining to the network element which it represents. This information is shown in FIG. 7B for the sake of clarity, but any feasible method may be used to store data as part of the graph data structure. Each edge E1-E8 may be directional, however, for the sake of clarity, all edges are depicted as bi-directional. For example, E3, connecting nodes N2 and N9, may be uni-directional in that it only allows traffic flow from N2 and N9, but not vice versa. As described above, the generated graph depicts a real-time status and configuration of the SDN enabled network. By registering an agent to receive updates from the network elements, the graph may be modified by the graph application 112 to reflect these changes. For example, if the network element represented by node N7 is removed from the SDN enabled network, the agent may receive this information from the SDN enabled network and update the graph accordingly. As devices are added, removed, and have their interfaces and capabilities updated, the graph may also be updated in real-time.

FIG. 7B illustrates a table 701 representing nodal attributes included in a graph used to represent a SDN enabled network, according to one embodiment. The use of a table to store and present the nodal attributes is merely exemplary, and should not be considered limiting of the disclosure. As previously stated, any method may be used to store the nodal attributes in the graph data structure. As shown, table 701 includes a node column representing each node N1-N9, as well as metadata and interface columns for each node N1-N9. The metadata columns may include any attribute of the network elements, and the metadata may be stored according to any appropriate format. For example, node N1 represents a network element having firewall, QoS, and L3 routing capabilities, while node N3 has VoIP as its only listed metadata attribute. The interfaces column indicates each interface for the node, and is formatted to show an edge, and the node it is connected to through the edge. The use of the edge:node formatting is exemplary, and should not be considered limiting of the disclosure, as any suitable formatting and values may be used to represent the interfaces, upstream/downstream nodes, and the edges connecting the nodes. As shown, node N2 has 3 interfaces, a first interface connected to node N1 through edge E1, a second interface connected to node N3 through edge E4, and a third interface connected to node N9 through edge E3. Node N8, for example, has a single interface which connects the node to Node N9 through edge E2.

An application programmer developing the networking application 113 may use the graph and associated nodal attributes to apply functions to a plurality of network elements at once. For example, assume a network administrator wished to give all data packets transmitted from his office computer priority over all other packets flowing through the SDN enabled network. To achieve this goal, embodiments disclosed herein would allow the network administrator to update to all network elements supporting QoS through the graph. Using the graph, an application may easily identify that the network elements represented by nodes N1, N2, N4, and N9 support QoS. Once the nodes have been identified using the graph, the networking application 113 may then issue commands to the network elements represented nodes N1, N2, N4, and N9, using a common programming framework, to apply the changes to the QoS policy of these network elements to prioritize the network administrator's traffic.

As another example, if L3 routing tables needed to be updated to reflect the addition (or removal) of a network element, an application developer may code a networking application 113 which identifies the network elements represented by nodes N1, N2, and N4 as supporting L3 routing. The networking application 113 may then be coded to issue commands to update the routing tables in the network elements represented by nodes N1, N2, and N4, using a common programming framework. Advantageously, the applications described in these use cases eliminate the need to manually configure each network element individually. Embodiments disclosed herein also ensure that only the appropriate network elements are targeted to apply functions. For example, node N5 was not targeted for either the QoS or routing table updates, as it only supports VoIP (and is likely an internet phone).

As previously indicated, the graph may provide metadata and attributes from any networking layer. For example, when inspecting packets moving through a network element, p2p application data may be examined, and source/destination information about the p2p data may be extracted and returned to the networking application 113. The networking application 113 may then use the source/destination information to generate a graph showing different views of the p2p data flow.

Figure 8C:
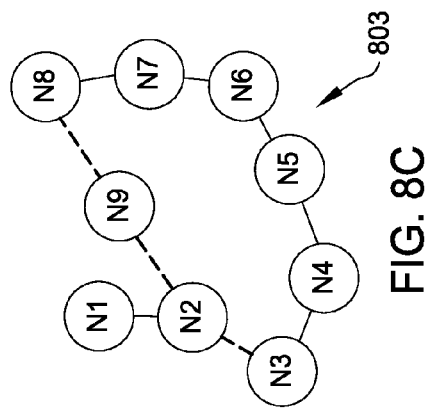
FIGS. 8A-8F illustrate the application of different functions to a graph used to represent a software defined network, according to one embodiment disclosed herein.
Figure 8B:
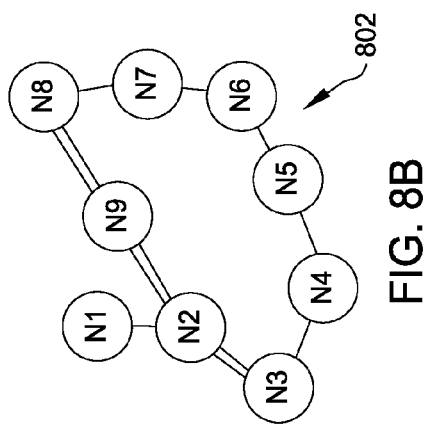
Figure 8A:
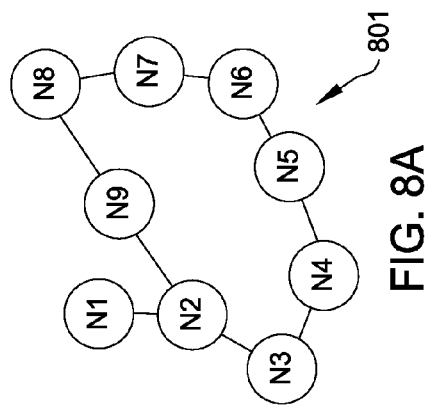
Figure 8F:
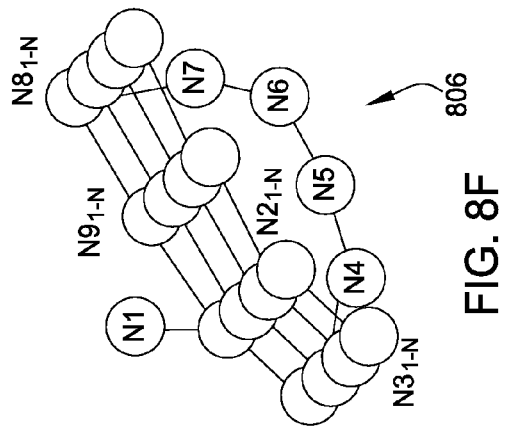
Figure 8E:
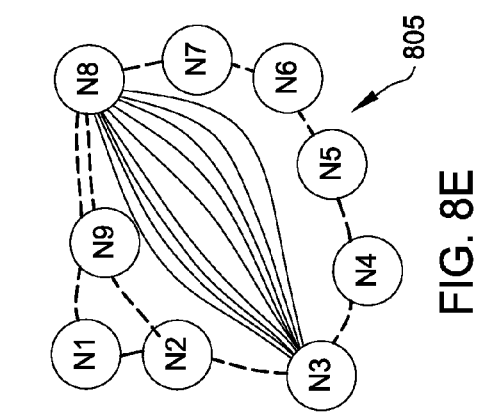
Figure 8D:
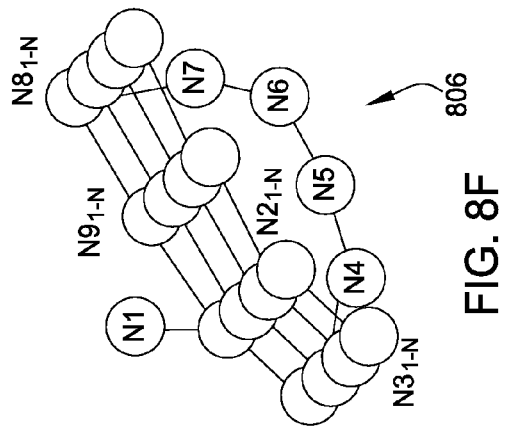

FIGS. 8A-8F illustrate the application of different functions (or operations) to a graph used to represent a SDN enabled network, according to one embodiment disclosed herein. As shown, FIG. 8A depicts a directed graph 801 including a complete set of nodes and edges, the nodes representing a respective network element, and the edges representing connections between the network elements in a SDN enabled network. In FIGS. 8A-F, only the nodes N1-N9 have been labeled, and the edges have not been labeled for the sake of clarity. To generate the graphs in FIGS. 8B-8F, a particular function is applied to the graph 801 by the networking application 113 in order to identify a relevant subset of nodes (or paths/edges connecting the subset of nodes). In FIG. 8B, a graph 802 reflecting a path, or graph segment between N3 and N8, including nodes N2 and N9, is depicted. In FIG. 8C, a graph 803 reflecting a circuit, or set of nodes, including nodes N3-N8, is depicted. In FIG. 8D, a graph 804 reflecting selection of a collection of nodes N1, N7, and N8 is depicted. In FIG. 8E, a graph 805 reflecting a set of data flows between nodes N3 and N8 is depicted. In FIG. 8F, a graph 806 reflecting a virtual SDN enabled network is depicted, with virtual nodes $N3_{1-N}$, $N2_{1-N}$, $N8_{1-N}$, $N9_{1-N}$ represented in the graph 806. As is shown, a broad range of functions may be applied to network elements by identifying their representative nodes and edges in the directed graph. Any networking function or configuration, presently known or unknown, may be applied to the SDN enabled network using the directed graph, and the use of the examples in FIGS. 8A-F should not be considered limiting of the disclosure.

In addition, embodiments disclosed herein may be used in an inverse manner to perform queries on an SDN enabled network, and return the state of the SDN enabled network as a function. Network traffic may also be treated as an infinitely long stream, which may be dynamically modified as the traffic progresses through the SDN enabled network. Finally, embodiments disclosed herein may be extended to apply functions on graph change events, with the type and nature of the event defining operations to be applied to the SDN enabled network.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method to represent a network using a programmable graph model, comprising:
   providing, by each of a plurality of network elements in the network, a plurality of service sets, wherein each of the plurality of service sets provides a plurality of application programming interfaces (APIs);
   receiving, from a first API of a first service set provided by each of the plurality of network elements, location information for each of the plurality of network elements;
   receiving, from a first API of a second service set provided by each of the plurality of network elements, a set of attributes of each of the plurality of network elements;
   generating, based on the received location information and sets of attributes, a directed graph to represent a topology of the network, wherein each of the plurality of network elements are represented in the directed graph by one of the plurality of nodes, wherein each node stores an indication of the set of attributes of the respective network element represented by the node;
   identifying, through the indication of the sets of attributes stored in the directed graph, a subset of network elements, of the plurality of network elements, upon which to apply a requested operation, wherein at least two of the network elements in the subset of network elements execute different operating systems; and
   applying the requested operation to the subset of network elements in a distributed manner through the directed graph, wherein the requested operation is applied by a first API provided by a third service set provided by the subset of network elements.

2. The method of claim 1, wherein each of the plurality of network elements supports a common programming model via the APIs, sets of attributes comprise: (i) link state information of the respective network element, (ii) routing information of the respective network element, (iii) source and destination information of application data flowing through the respective network element, (iv) hardware components of the respective network element, (v) capabilities of the respective element, and (vi) a set of neighboring network elements each respective network element is directly connected to.

3. The method of claim 2, wherein receiving the location information and set of attributes of each network element comprises:
   prior to receiving the location information for each of the plurality of network elements, querying, via the first API of the first service set, each of the plurality of network elements; and
   prior to receiving the set of attributes from each of the plurality of network elements, querying, via the first API of the second service set, each of the plurality of network elements.

4. The method of claim 3, further comprising:
   configuring an agent to receive updated attribute values from each of the plurality of network elements when a change is made to the current attribute values.

5. The method of claim 4, wherein an edge in the directed graph represents a link between an input interface of a first node and an output interface second node, of the plurality of nodes.

6. The method of claim 5, wherein the requested operation is a networking function supported by the input interface of the first node and the output interface of the second node, wherein the networking function is applied to the input interface of the first node and the output interface of the second node.

7. The method of claim 6, wherein the networking function is not supported by a third node, wherein the networking function is not applied to the third node.

8. The method of claim 6, wherein the common programming model applies the networking function equally across each of the plurality of network elements including the at least two networking elements in the subset executing different operating systems.

9. The method of claim 8, wherein a first network element represented by a first node in the topology graph is one of: (i) a physical network element, and (ii) a virtual network element.

10. The method of claim 9, wherein the subset of network elements is identified by: (i) filtering the directed graph, (ii) identifying a virtual path through the directed graph from a first node to a second node, (iii) identifying a logical path through the directed graph from the first node to the second node, (iv) identifying a subset of nodes having at least one specified attribute, and (v) identifying a flow from the first node to the second node.

11. A computer program product to represent a network using a programmable graph model, comprising:
    a non-transitory computer-readable storage medium having computer-readable program code embedded therewith, the computer-readable program code executable by a processor to perform an operation comprising:
    providing, by each of a plurality of network elements in the network, a plurality of service sets, wherein each of the plurality of service sets provides a plurality of application programming interfaces (APIs);
    receiving, from a first API of a first service set provided by each of the plurality of network elements, location information for each of the plurality of network elements;
    receiving, from a first API of a second service set provided by each of the plurality of network elements, a set of attributes of each of the plurality of network elements;
    generating, based on the received location information and sets of attributes, a directed graph to represent a topology of the network, wherein each of the plurality of network elements are represented in the directed graph by one of the plurality of nodes, wherein each node stores an indication of the set of attributes of the respective network element represented by the node;
    identifying, through the indication of the sets of attributes stored in the directed graph, a subset of network elements, of the plurality of network elements, upon which to apply a requested operation, wherein at least two of the network elements in the subset of network elements execute different operating systems; and
    applying the requested operation to the subset of network elements in a distributed manner through the directed graph, wherein the requested operation is applied by a first API provided by a third service set provided by the subset of network elements.

12. The computer program product of claim 11, wherein each of the plurality of network elements supports a common programming model via the APIs, sets of attributes comprise: (i) link state information of the respective network element, (ii) routing information of the respective network element, (iii) source and destination information of application data flowing through the respective network element, (iv) hardware components of the respective network element, (v) capabilities of the respective element, and (vi) a set of neighboring network elements each respective network element is directly connected to.

13. The computer program product of claim 12, wherein receiving the location information and set of attributes of each network element comprises:
   prior to receiving the location information for each of the plurality of network elements, querying, via the first API of the first service set, each of the plurality of network elements; and
   prior to receiving the set of attributes from each of the plurality of network elements, querying, via the first API of the second service set, each of the plurality of network elements.

14. The computer program product of claim 13, the operation further comprising:
   configuring an agent to receive updated attribute values from each of the plurality of network elements when a change is made to the current attribute values.

15. The computer program product of claim 14, wherein an edge in the directed graph represents a link between an input interface of a first node and an output interface second node, of the plurality of nodes.

16. The computer program product of claim 15, wherein the requested operation is a networking function supported by the input interface of the first node and the output interface of the second node, wherein the networking function is applied to the input interface of the first node and the output interface of the second node.

17. The computer program product of claim 16, wherein the networking function is not supported by a third node, wherein the networking function is not applied to the third node.

18. The computer program product of claim 16, wherein the common programming model applies the networking function equally across each of the plurality of network elements including the at least two networking elements in the subset executing different operating systems.

19. The computer program product of claim 18, wherein a first network element represented by a first node in the topology graph is one of: (i) a physical network element, and (ii) a virtual network element.

20. The computer program product of claim 19, wherein the subset of network elements is identified by: (i) filtering the directed graph, (ii) identifying a virtual path through the directed graph from a first node to a second node, (iii) identifying a logical path through the directed graph from the first node to the second node, (iv) identifying a subset of nodes having at least one specified attribute, and (v) identifying a flow from the first node to the second node.

21. A system, comprising:
   one or more computer processors; and
   a memory containing a program which when executed by the one or more computer processors performs an operation to represent a network using a programmable graph model, the operation comprising:
      providing, by each of a plurality of network elements in the network, a plurality of service sets, wherein each of the plurality of service sets provides a plurality of application programming interfaces (APIs;
      receiving, from a first API of a first service set provided by each of the plurality of network elements, location information for each of the plurality of network elements;
      receiving, from a first API of a second service set provided by each of the plurality of network elements, a set of attributes of each of the plurality of network elements;
      generating, based on the received location information and sets of attributes, a directed graph to represent a topology of the network, wherein each of the plurality of network elements are represented in the directed graph by one of the plurality of nodes, wherein each node stores an indication of the set of attributes of the respective network element represented by the node;
      identifying, through the indication of the sets of attributes stored in the directed graph, a subset of network elements, of the plurality of network elements, upon which to apply a requested operation, wherein at least two of the network elements in the subset of network elements execute different operating systems; and
      applying the requested operation to the subset of network elements in a distributed manner through the directed graph, wherein the requested operation is applied by a first API provided by a third service set provided by the subset of network elements.

22. The system of claim 21, wherein each of the plurality of network elements supports a common programming model via the APIs, sets of attributes comprise: (i) link state information of the respective network element, (ii) routing information of the respective network element, (iii) source and destination information of application data flowing through the respective network element, (iv) hardware components of the respective network element, (v) capabilities of the respective element, and (vi) a set of neighboring network elements each respective network element is directly connected to.

23. The system of claim 22, wherein receiving the location information and set of attributes of each network element comprises:
   prior to receiving the location information for each of the plurality of network elements, querying, via the first API of the first service set, each of the plurality of network elements; and
   prior to receiving the set of attributes from each of the plurality of network elements, querying, via the first API of the second service set, each of the plurality of network elements.

24. The system of claim 23, the operation further comprising:
   configuring an agent to receive updated attribute values from each of the plurality of network elements when a change is made to the current attribute values.

25. The system of claim 21, wherein an edge in the directed graph represents a link between an input interface of a first node and an output interface second node, of the plurality of nodes.

26. The system of claim 25, wherein the requested operation is a networking function supported by the input interface of the first node and the output interface of the second node, wherein the networking function is applied to the input interface of the first node and the output interface of the second node.

27. The system of claim 26, wherein the networking function is not supported by a third node, wherein the networking function is not applied to the third node.

28. The system of claim 26, wherein the common programming model applies the networking function equally across each of the plurality of network elements including the at least two networking elements in the subset executing different operating systems.

29. The system of claim 28, wherein a first network element represented by a first node in the topology graph is one of: (i) a physical network element, and (ii) a virtual network element.

30. The system of claim 29, wherein the subset of network elements is identified by each of: (i) filtering the directed graph, (ii) identifying a virtual path through the directed graph from a first node to a second node, (iii) identifying a logical path through the directed graph from the first node to the second node, (iv) identifying a subset of nodes having at least one specified attribute, and (v) identifying a flow from the first node to the second node.

* * * * *

UNITED STATES PATENT AND TRADEMARK OFFICE
CERTIFICATE OF CORRECTION

PATENT NO. : 9,596,141 B2  
APPLICATION NO. : 13/844021  
DATED : March 14, 2017  
INVENTOR(S) : John E. McDowall Page 1 of 1

It is certified that error appears in the above-identified patent and that said Letters Patent is hereby corrected as shown below:

On sheet 6 of 8, in Figure 6, reference numeral 520, Line 1, delete "INDENTIFY" and insert -- IDENTIFY --, therefor.

In Column 16, Line 3, in Claim 5, after "interface" insert -- of the --.

In Column 17, Line 31, in Claim 15, after "interface" insert -- of the --.

In Column 18, Line 2, in Claim 21, delete "(APIs;" and insert -- (APIs); --, therefor.

In Column 18, Line 60, in Claim 25, after "interface" insert -- of the --.

Signed and Sealed this
Twenty-third Day of May, 2017

Michelle K. Lee
*Director of the United States Patent and Trademark Office*